(12) United States Patent
Omori

(10) Patent No.: US 10,831,176 B2
(45) Date of Patent: Nov. 10, 2020

(54) NUMERICAL CONTROLLER MONITORING REMOVAL OF DAISY CHAINED DEVICES

(71) Applicant: Fanuc Corporation, Yamanashi (JP)

(72) Inventor: Takahiro Omori, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/282,572

(22) Filed: Feb. 22, 2019

(65) Prior Publication Data

US 2019/0271964 A1 Sep. 5, 2019

(30) Foreign Application Priority Data

Mar. 1, 2018 (JP) ................... 2018-036231

(51) Int. Cl.
  *G05B 19/4065* (2006.01)
  *G05B 19/4155* (2006.01)
(52) U.S. Cl.
  CPC ..... *G05B 19/4065* (2013.01); *G05B 19/4155* (2013.01); *G05B 2219/33226* (2013.01)
(58) Field of Classification Search
  CPC ............ G05B 19/4065; G05B 19/4155; G05B 2219/33226; G05B 19/4185; G05B 2219/31346; G05B 2219/34013; G05B 19/4142
  See application file for complete search history.

(56) References Cited

U.S. PATENT DOCUMENTS

| 3,878,445 | A | 4/1975 | Kirkman et al. |
| 10,012,975 | B2 * | 7/2018 | Baba .................. G05B 19/402 |
| 2002/0010520 | A1 | 1/2002 | Matsubara et al. |
| 2003/0046476 | A1 * | 3/2003 | Chong ................ H04Q 11/04 |
| | | | 710/316 |

(Continued)

FOREIGN PATENT DOCUMENTS

| JP | 58-026590 A | 2/1983 |
| JP | 62251952 A * | 11/1987 ............. G06F 13/37 |

(Continued)

OTHER PUBLICATIONS

Notice of Reasons for Refusal for Japanese Application No. 2018-036231, dated Mar. 3, 2020, with translation, 6 pages.

*Primary Examiner* — Michael D Masinick
(74) *Attorney, Agent, or Firm* — RatnerPrestia

(57) ABSTRACT

Provided is a numerical controller in which a plurality of devices is allowed to be connected to a serial bus by a daisy chain, acquiring, from each of the devices, a connection number on the daisy chain and a device ID as connection information, determining presence or absence of a problem by comparing the connection information with a connection setting parameter obtained by associating the connection number with a logic axis number of the numerical controller, storing the connection information acquired by the connection information acquisition unit when there is no problem in the determination, and identifying a removed device by comparing the connection information acquired by the con- (Continued)

nection information acquisition unit with the connection information stored in the connection information storage unit when there is a problem in the determination, and excluding the removed device from the connection setting parameter, thereby creating connection setting data.

5 Claims, 11 Drawing Sheets

(56) References Cited

U.S. PATENT DOCUMENTS

| | | |
|---|---|---|
| 2008/0123723 A1 | 5/2008 | Aoyama et al. |
| 2008/0189445 A1 | 8/2008 | Hada et al. |
| 2009/0109774 A1* | 4/2009 | Bucksch ............ G11C 29/1201 365/201 |
| 2011/0208886 A1* | 8/2011 | Sugiura ................ H04L 12/403 710/110 |
| 2016/0209827 A1* | 7/2016 | Baba .................... G05B 19/402 |

FOREIGN PATENT DOCUMENTS

| | | |
|---|---|---|
| JP | 10124131 A | 5/1998 |
| JP | 2008-135855 A | 6/2008 |
| JP | 2008191989 A | 8/2008 |

* cited by examiner

| CONNECTION NUMBER | IDENTIFICATION INFORMATION |
|---|---|
| 1 | SP-AMP-0001 |
| 2 | SV-AMP-0001 |
| 3 | SV-AMP-0002 |
| 4 | SV-AMP-0003 |

| CONNECTION NUMBER | IDENTIFICATION INFORMATION |
|---|---|
| 1 | SP-AMP-0001 |
| 2 | SV-AMP-0001 |
| 3 | SV-AMP-0003 |
| 4 | - |

FIG.16

| LOGIC AXIS NUMBER | CONNECTION NUMBER |
|---|---|
| 1 | 1 |
| 2 | 2 |
| 3 | 3 |
| 4 | 4 |

FIG.17

| LOGIC AXIS NUMBER | CONNECTION NUMBER |
|---|---|
| 1 | 1 |
| 2 | 2 |
| 4 | 3 |

NUMERICAL CONTROLLER MONITORING REMOVAL OF DAISY CHAINED DEVICES

RELATED APPLICATIONS

The present application claims priority to Japanese Patent Application Number 2018-036231 filed Mar. 1, 2018, the disclosure of which is hereby incorporated by reference herein in its entirety.

BACKGROUND OF THE INVENTION

1. Field of the Invention

The application relates to a numerical controller, and particularly relates to a numerical controller from which a serial bus-connected device can be easily removed.

2. Description of the Related Art

As illustrated in FIG. 1, a device (for example, a spindle amplifier SP, a servo amplifier SV, a motor, a position detector PS, etc.) connected to a numerical controller CNC by a serial bus using a daisy chain system is associated with an axis driven by the numerical controller by setting a connection setting parameter (see JP 58-26590 A and JP 2008-135855 A).

The case of changing a connection relationship between the numerical controller and the device, for example, the case of removing some devices (a shaded device of FIG. 2) as illustrate in FIG. 2 is considered. Typically, in some cases, when a device connected to the numerical controller by a serial bus fails, if the failed device does not affect machining, the device is removed to perform machining. In such a case, conventionally, it has been necessary to reset a connection setting parameter and associate the device with an axis driven by the numerical controller again.

When parameter setting is erroneously performed after some devices are temporarily removed, there is a problem that the axis driven by the numerical controller is associated with an unintended device. Therefore, when it is unnecessary to reset a parameter in the case of temporarily changing connection of the serial bus, it is possible to save effort to reset the parameter, and to prevent an influence due to erroneous setting.

The application has been made to solve such a problem, and an object of the application is to provide a numerical controller from which a serial bus-connected device can be easily removed.

SUMMARY OF THE INVENTION

A numerical controller according to an embodiment of the application is a numerical controller in which a plurality of devices is allowed to be connected to a serial bus by a daisy chain, the numerical controller including a connection information acquisition unit for acquiring, from each of the devices, a connection number indicating a connection position of the device on the daisy chain and a device ID corresponding to identification information unique to the device as connection information, a connection information comparison unit for determining presence or absence of a problem by comparing the connection information with a connection setting parameter obtained by associating the connection number with a logic axis number corresponding to identification information of a logic axis of the numerical controller, a connection information storage unit for storing the connection information acquired by the connection information acquisition unit when there is no problem in the determination, and a connection setting data creation unit for identifying a removed device by comparing the connection information acquired by the connection information acquisition unit with the connection information stored in the connection information storage unit when there is a problem in the determination, and excluding the removed device from the connection setting parameter, thereby creating connection setting data.

In a numerical controller according to an embodiment of the application, the connection information comparison unit determines that there is a problem when the connection number included in the connection setting parameter does not match the connection number included in the connection information, and determines that there is no problem otherwise.

In numerical controller according to an embodiment of the application, the connection setting data creation unit identifies an unmatched device ID as the removed device by comparing the connection information acquired by the connection information acquisition unit with the connection information stored in the connection information storage unit.

In numerical controller according to an embodiment of the application, the connection setting data creation unit creates the connection setting data by deleting a record matching a connection number of the removed device from the connection setting parameter.

In numerical controller according to an embodiment of the application, the connection setting data creation unit causes the connection information acquired by the connection information acquisition unit to be listed and displayed, detects that one of the displayed connection information has been designated, and identifies a device ID related to the designated connection information as the removed device.

According to the application, it is possible to provide a numerical controller from which a serial bus-connected device can be easily removed.

BRIEF DESCRIPTION OF THE DRAWINGS

The above-described object and characteristic of the application and other objects and characteristics will be clear from description of embodiments below with reference to accompanying drawings. In the drawings:

FIG. 16 is a diagram illustrating an example of a connection setting parameter before removal of a device; and FIG. 17 is a diagram illustrating an example of a table produced by a connection setting data creation unit.

DETAILED DESCRIPTION OF THE PREFERRED EMBODIMENTS

A description will be given of a configuration of a numerical controller 1 according to an embodiment of the application.

Figure 1:
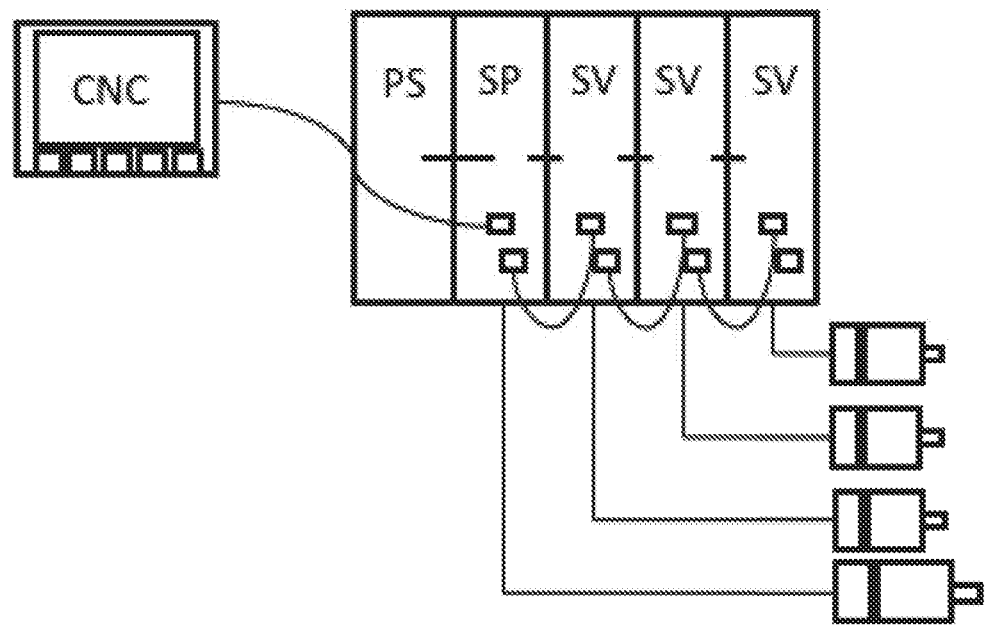
FIG. 1 is a diagram illustrating an example of a device connected to a numerical controller by a serial bus.
Figure 2:
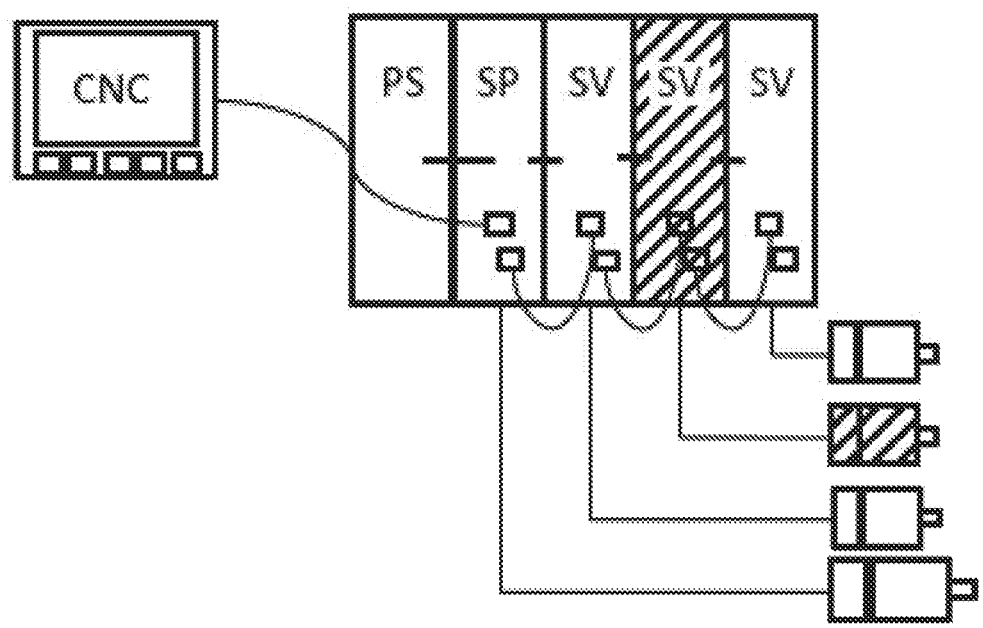
FIG. 2 is a diagram illustrating an example of a device connected to a numerical controller by a serial bus.
Figure 3:
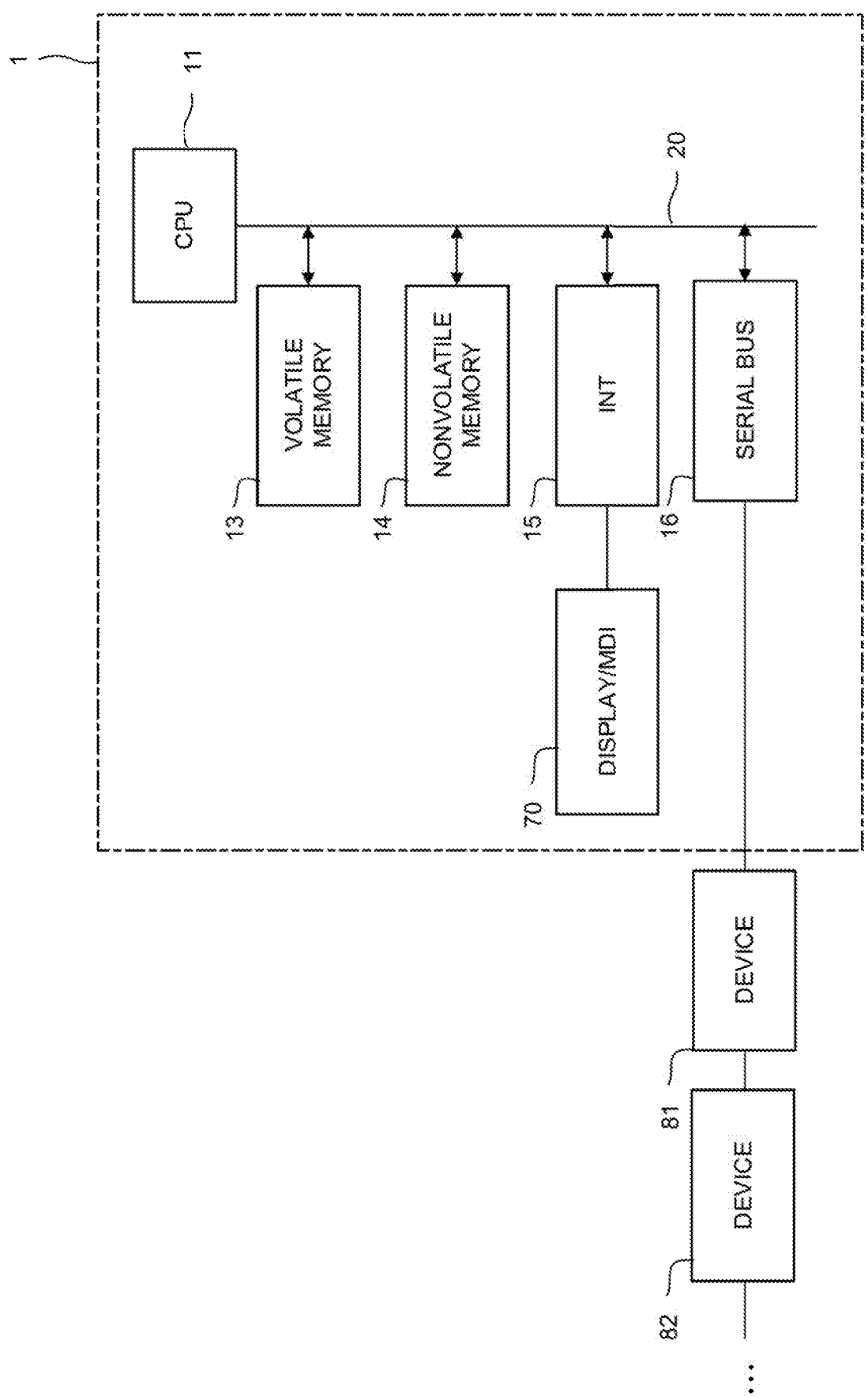
FIG. 3 is a diagram illustrating a schematic hardware configuration of a numerical controller.

FIG. 3 is a schematic hardware configuration diagram of a main part of the numerical controller 1 according to the embodiment of the application.

A central processing unit (CPU) 11 included in the numerical controller 1 is a processor that controls the numerical controller 1 as a whole. The CPU 11 reads a program stored in a nonvolatile memory 14 via a bus 20, and controls the entire numerical controller 1 according to the program.

For example, the nonvolatile memory 14 is configured as a memory that is kept in a storage state even when a power source of the numerical controller 1 is turned OFF by being backed up by a battery (not illustrated). A program, data, etc. stored in the nonvolatile memory 14 may be loaded in a volatile memory 13 during use. The volatile memory 13 stores temporary calculation data, display data, data input via an input device, etc. in addition to the program and the data loaded from the nonvolatile memory 14.

A display/manual data input (MDI) unit 70 is a data input/output device including a display, a keyboard, etc. A command and data input from the keyboard of the display/MDI unit 70 are transferred to the CPU 11 via an interface 15. In addition, display data output from the CPU 11 is displayed on a display of the display/MDI unit 70 via the interface 15.

A serial bus 16 is an interface for connecting one or more devices 81, 82, . . . by a daisy chain system. Data input from the devices 81, 82, . . . are transferred to the CPU 11 via the serial bus 16. In addition, the command and the data output from the CPU 11 are input to the devices 81, 82, . . . via the serial bus 16.

Each of the devices 81, 82, . . . has a device control unit. In response to a request from a connection information acquisition unit (described below) of the numerical controller, the device control unit transmits identification information (hereinafter referred to as a device ID) capable of uniquely identifying the device. For example, the device ID is a manufacturing number, a serial number, etc.

Figure 4:
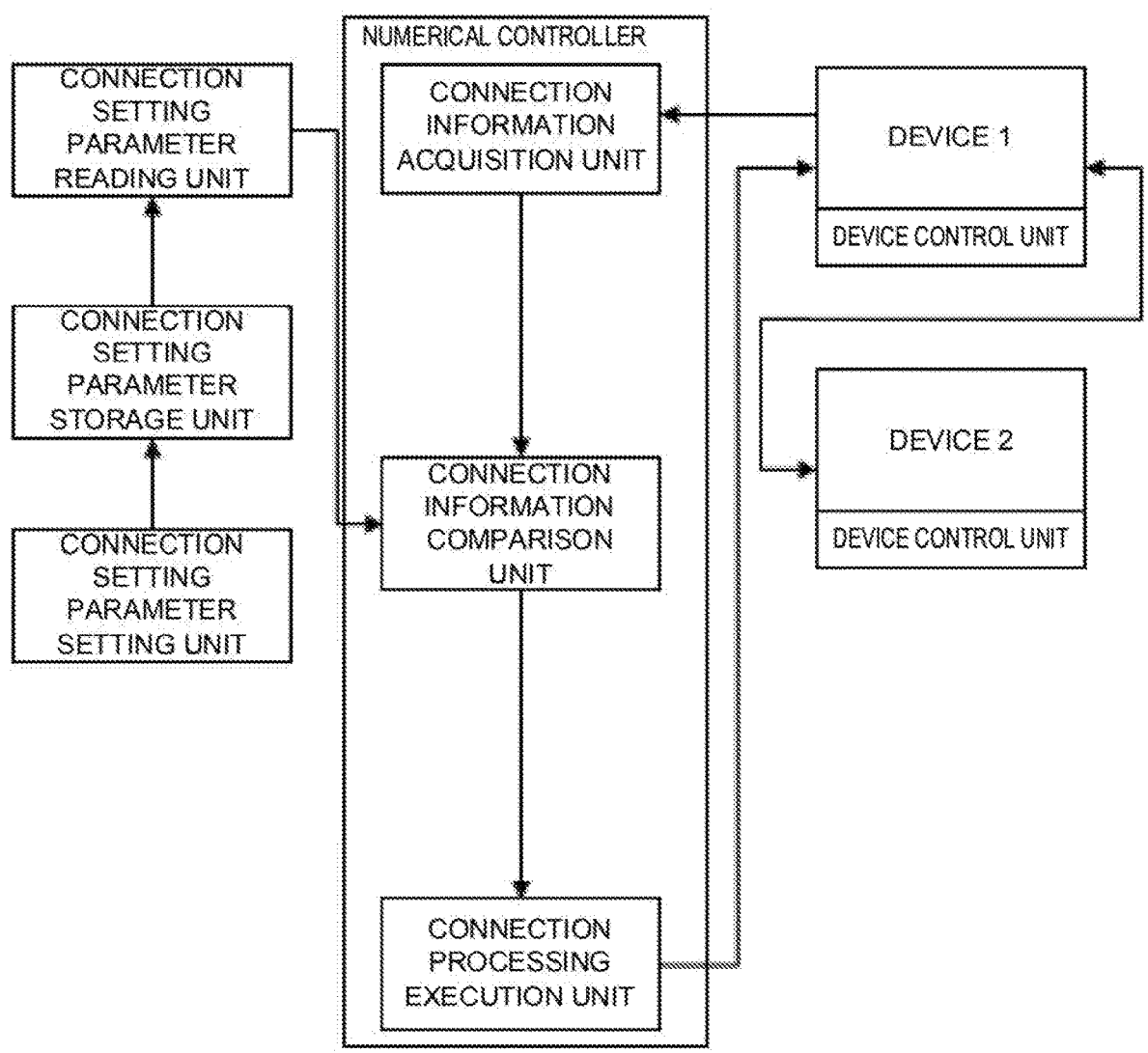
FIG. 4 is a diagram illustrating a schematic functional configuration of a conventional numerical controller.
Figure 5:
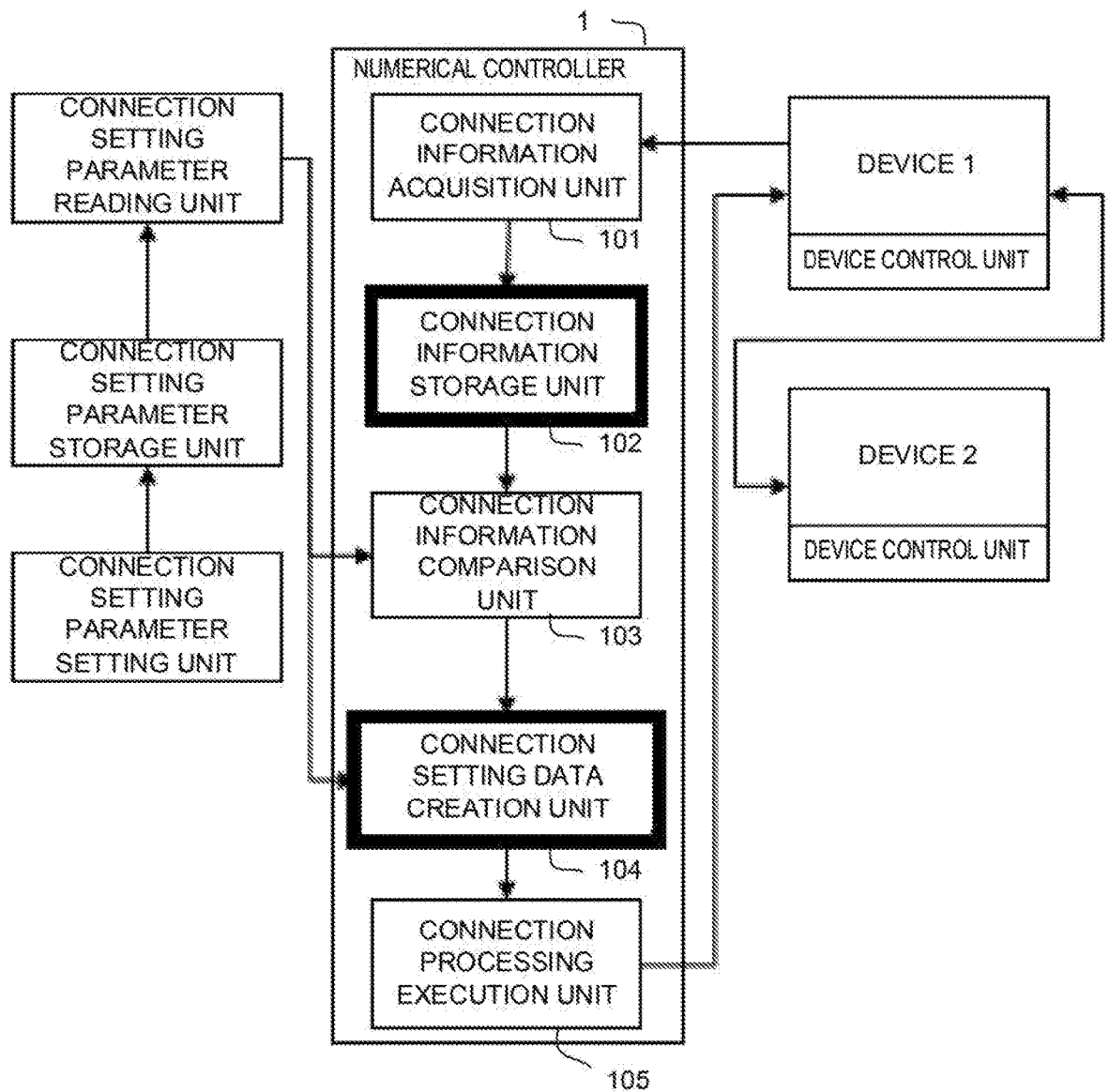
FIG. 5 is a diagram illustrating a schematic functional configuration of the numerical controller.

FIG. 5 is a block diagram illustrating a schematic functional configuration of the numerical controller 1 according to the embodiment of the application. FIG. 4 is a block diagram illustrating a schematic functional configuration of a conventional numerical controller. The functional configuration of the numerical controller 1 will be described while comparing the two cases.

The conventional numerical controller includes a connection information acquisition unit that acquires connection information from each of devices (device 1, device 2, . . . ) connected to a serial bus by a daisy chain, a connection information comparison unit that verifies presence/absence of a problem by comparing the connection information with a connection setting parameter read from an outside, and a connection processing execution unit that performs connection processing with a device by creating connection setting data.

Figures 13, 14, 15:
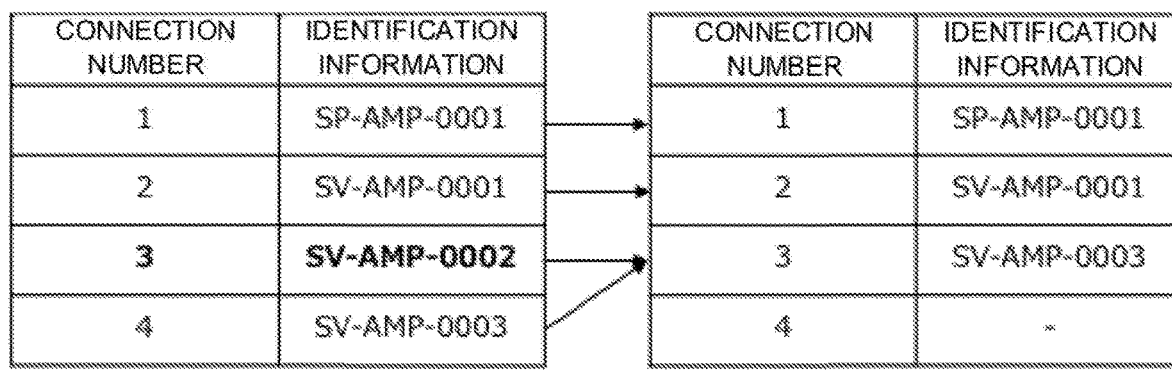
FIG. 13 is a diagram illustrating an example of connection information before removal of a device.
FIG. 14 is a diagram illustrating an example of connection information after removal of a device.
FIG. 15 is a diagram describing a process of identifying a removed device.

The connection information refers to information indicating a correspondence between a connection number indicating a position of a device on the daisy chain and a device ID. In the present embodiment, it is presumed that the connection number is numbered in ascending order of 1, 2, . . . from a position close to the numerical controller. FIG. 13 illustrates an example of the connection information.

The connection setting parameter refers to information indicating a correspondence between a number (hereinafter referred to as a logic axis number) of an axis driven by the numerical controller and a connection number. FIG. 16 illustrates an example of the connection setting parameter.

Figure 12:
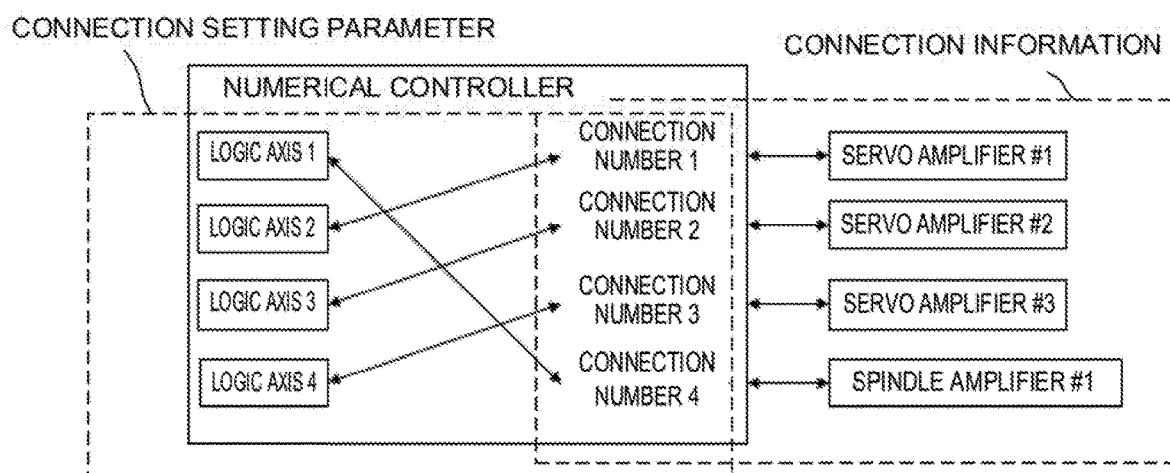
FIG. 12 is a diagram illustrating a relationship between connection information and a connection setting parameter.

FIG. 12 is a diagram illustrating a relationship between the connection information and the connection setting parameter. By combining the connection information and the connection setting parameter, the logic axis number and the device ID are associated via the connection number.

The connection setting data refers to setting data for performing connection processing with a device, which is created based on the connection setting parameter.

A system for creation of the connection setting parameter by a user is present on an outside of the numerical controller. The system includes a connection setting parameter setting unit that provides an interface, etc. for creation of the connection setting parameter by the user, a connection setting parameter storage unit that stores the created connection setting parameter, and a connection setting parameter reading unit that causes the numerical controller to read the stored connection setting parameter.

Meanwhile, the numerical controller 1 according to the present embodiment includes a connection information acquisition unit 101, a connection information storage unit 102, a connection information comparison unit 103, a connection setting data creation unit 104, and a connection processing execution unit 105. Among these units, the connection information storage unit 102 and the connection setting data creation unit 104 are unique components of the numerical controller 1.

The connection information acquisition unit 101 acquires connection information similarly to the conventional numerical controller.

The connection information storage unit 102 stores the connection information acquired by the connection information acquisition unit 101.

Similarly to the conventional numerical controller, the connection information comparison unit 130 verifies presence/absence of a problem by comparing the connection information with a connection setting parameter read from the outside.

The connection setting data creation unit 104 identifies a removed device by comparing the connection information acquired by the connection information storage unit 102 and the connection information acquired by the connection information acquisition unit 101. In addition, the connection setting data creation unit 104 creates connection setting data obtained by excluding the removed device from the connection setting parameter.

The connection processing execution unit 105 performs connection processing with the device using the connection setting data created by the connection setting data creation unit 104.

Figure 6:
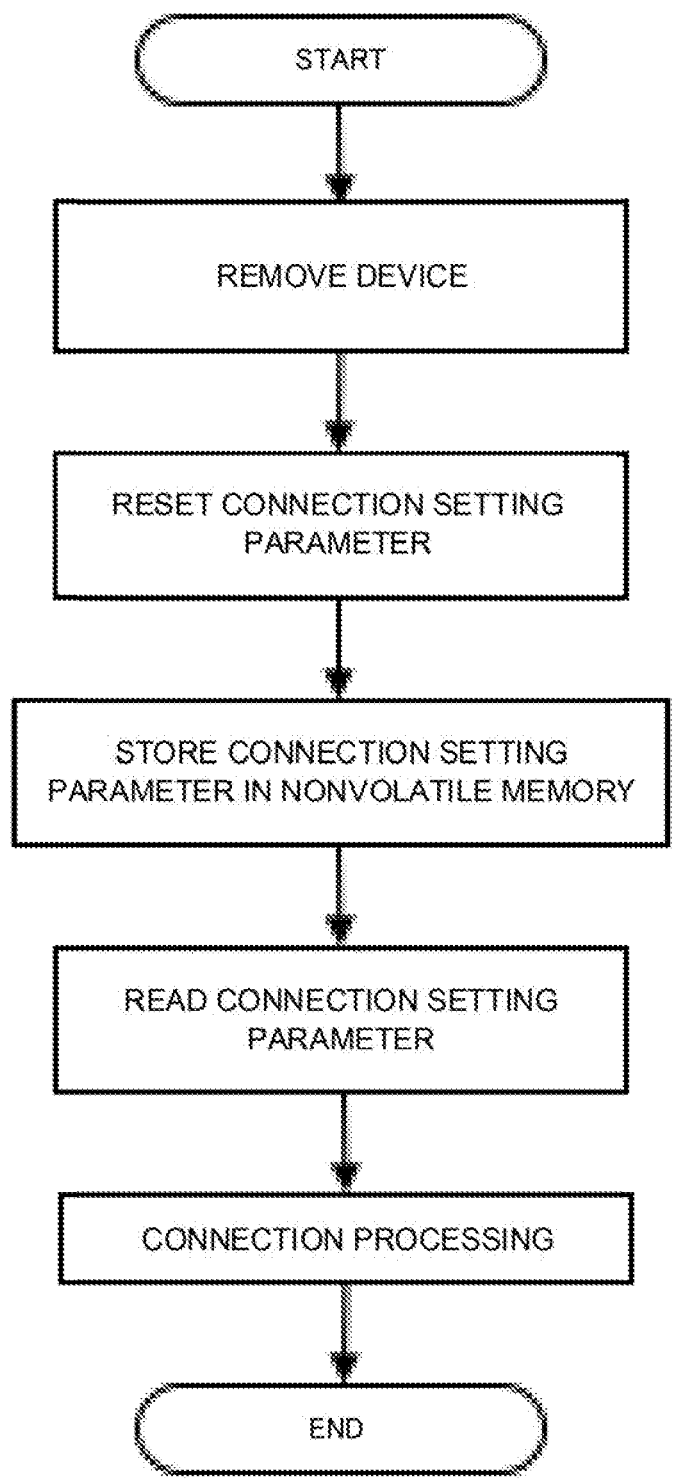
FIG. 6 is a flowchart illustrating an operation of the conventional numerical controller.
Figure 7:
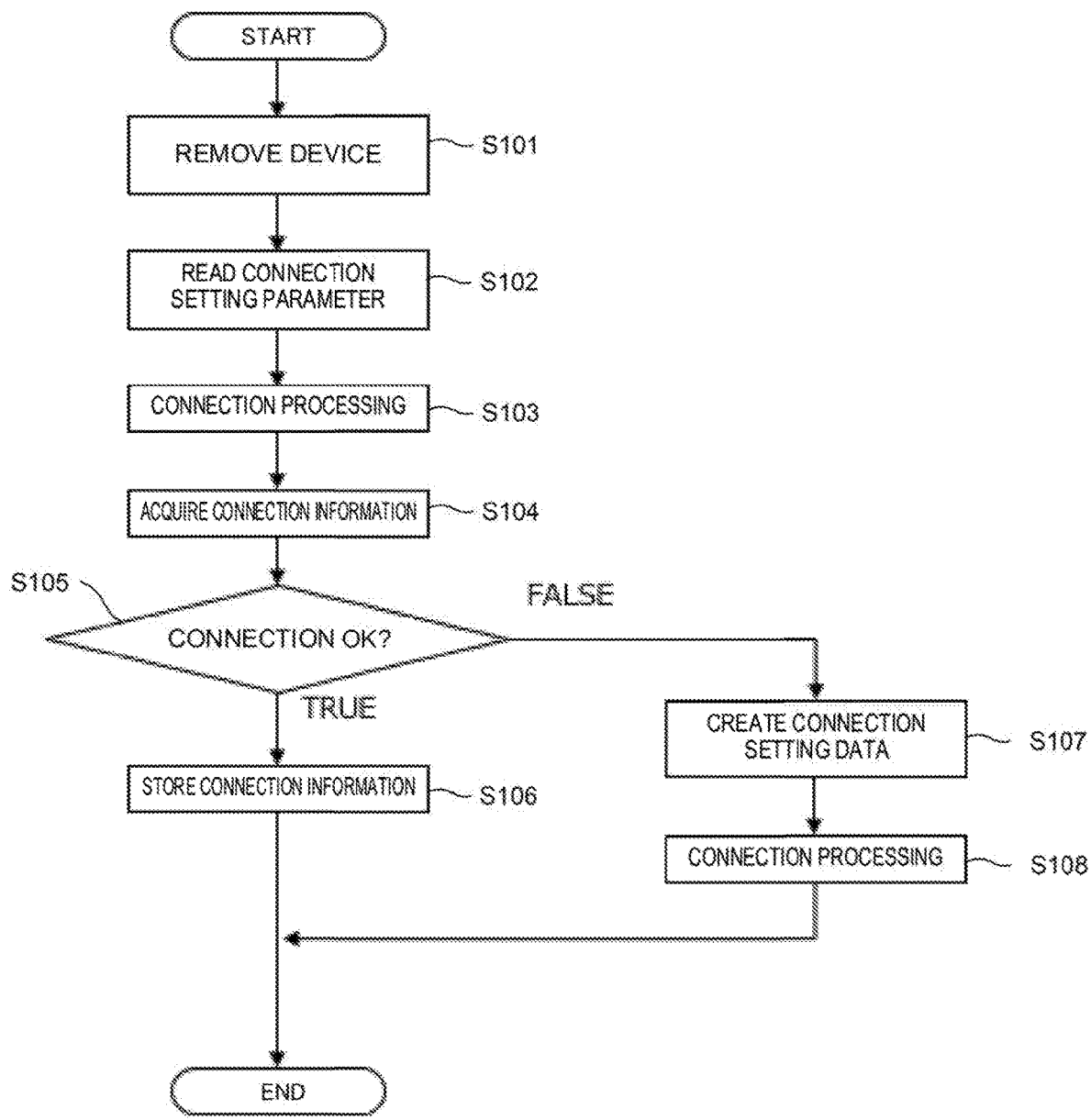
FIG. 7 is a flowchart illustrating an operation of the numerical controller.

FIG. 7 is a flowchart illustrating an operation of the numerical controller 1 according to the embodiment of the application when the device connected to the serial bus by the daisy chain is removed. FIG. 6 is a flowchart illustrating an operation of the conventional numerical controller in the same case. The operation of the numerical controller 1 will be described while comparing the two cases.

A removal procedure of a device in the conventional numerical controller is as follows. After the device is removed, the user recreates a connection setting parameter using a connection setting parameter setting unit of an external system. That is, the user newly creates a connection setting parameter related to a device connected to the numerical controller after excluding the removed device. When a device connected in the middle of the daisy chain is removed, a connection number of a device subsequent to the device is changed. The created connection setting parameter is stored in the nonvolatile memory of the connection setting parameter storage unit. The connection setting parameter reading unit causes the numerical controller to read the recreated connection setting parameter.

Finally, connection processing is performed in the numerical controller. In more detail, the connection information acquisition unit acquires connection information from each device connected to the serial bus by the daisy chain. The connection information comparison unit verifies presence/absence of a problem by comparing the acquired connection information with a connection setting parameter read from the outside. That is, when all connection numbers included in the connection information match all connection numbers included in the connection setting parameter, the connection information comparison unit determines that there is no problem. On the other hand, when there is a discrepancy between connection numbers included in the connection information and connection numbers included in the connection setting parameter, it is determined that there is an error, and connection processing is finished. When it is determined that there is no problem, the connection processing execution unit creates connection setting data based on the connection setting parameter and performs connection processing with a device.

Figure 8:
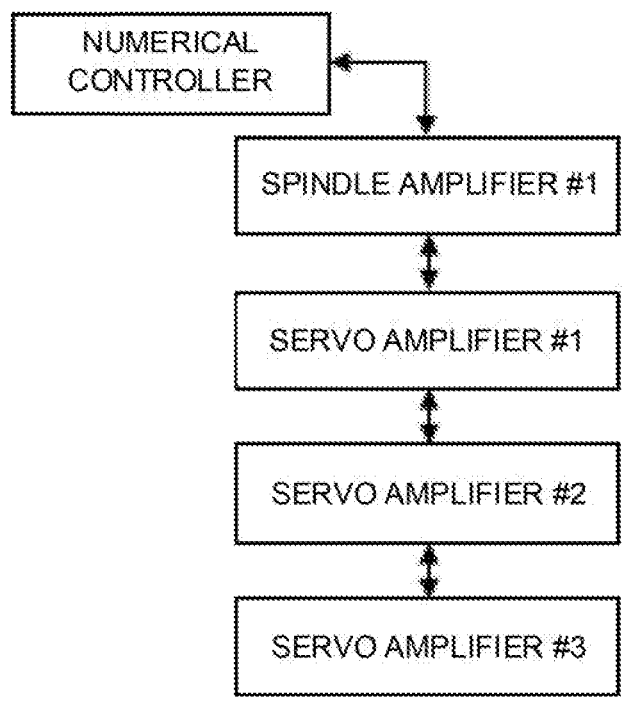
FIG. 8 is a diagram illustrating an example of a connection status of devices before removal.
Figure 9:
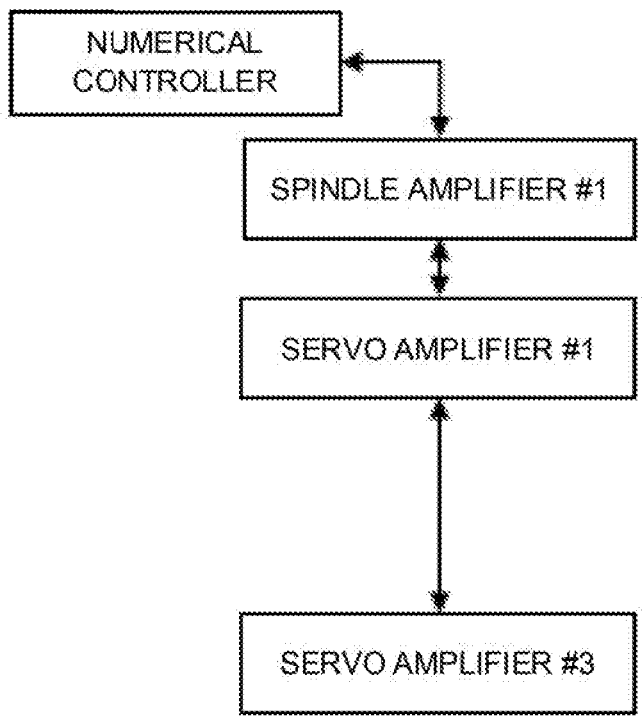
FIG. 9 is a diagram illustrating an example of a connection status of devices after removal.

Meanwhile, a removal procedure of the device in the numerical controller 1 according to the present embodiment is as follows. An operation of the numerical controller 1 will be described using examples illustrated in FIG. 8 and FIG. 9. FIG. 8 illustrates a connection status of devices before removal. A spindle amplifier #1, a servo amplifier #1, a servo amplifier #2, and a servo amplifier #3 are connected by a daisy chain in order from the numerical controller 1 side. FIG. 9 illustrates a connection status of devices after the servo amplifier #2 is removed among the amplifiers. The spindle amplifier #1, the servo amplifier #1, and the servo amplifier #3 are connected by a daisy chain in order from the numerical controller 1 side.

S101: Removal of a device is performed by a technician, and remaining devices except for the removed device are connected (FIG. 9).

S102: The connection information comparison unit 103 reads a connection setting parameter from the connection setting parameter reading unit of the external system. The connection setting parameter read herein is a connection setting parameter which is created by the connection setting parameter setting unit and stored in the connection setting parameter storage unit before removal of the device (FIG. 8). That is, the connection setting parameter read herein is a connection setting parameter reflecting a connection state illustrated in FIG. 8.

S103: The connection processing execution unit 105 starts connection processing using the connection setting parameter acquired in S102.

S104: The connection information acquisition unit 101 requests that a device control unit of each device transmit a device ID. The device control unit of each device transmits the device ID to the connection information acquisition unit 101. The connection information acquisition unit 101 receives the device ID. In this way, the connection information acquisition unit 101 acquires information related to an order of connection of the device to the serial bus. That is, since a device ID of a device closer to the numerical controller 1 is received early, the connection number equals an order of reception. Alternatively, the device control unit of each device may transmit information corresponding to a set of the connection number and the device ID.

S105: The connection information comparison unit 103 compares the connection information with the connection setting parameter, and verifies whether there is any problem in setting. When there is no problem, that is, when all connection numbers included in the connection information match all connection numbers included in the connection setting parameter, the operation proceeds to TRUE processing (S106). On the other hand, when there is a problem, that is, when there is a mismatch in connection numbers included in the connection information and connection numbers included in the connection setting parameter, the operation proceeds to FALSE processing (S107). When a device is removed, there is a discrepancy between the connection setting parameter acquired in S102 (created on the assumption of the connection status illustrated in FIG. 8) and the connection information acquired in S104 (reflecting the connection status illustrated in FIG. 9), and thus the operation proceeds to FALSE processing.

S106: The connection information storage unit 102 stores the connection information acquired by the connection information acquisition unit 101 in S104. The stored connection information is used for connection processing when a device is removed in the future (S107).

S107: The connection setting data creation unit 104 compares the connection information acquired by the connection information acquisition unit 101 in S104 with the connection information stored in the connection information storage unit at previous connection (S106), and identifies a removed device (referred to as device A).

Figure 10:
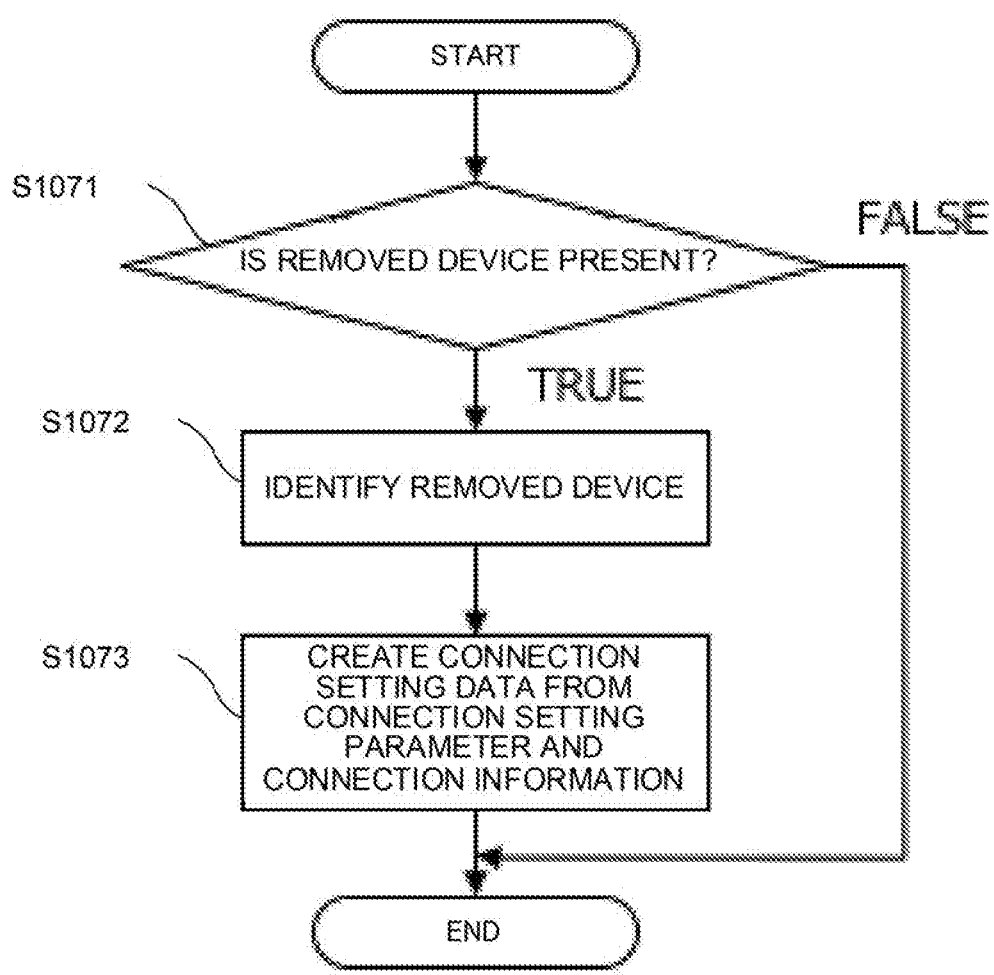
FIG. 10 is a diagram describing connection setting data creation processing.

Connection setting data creation processing of S107 will be described in more detail with reference to FIG. 10.

S1071: When the connection setting data creation unit 104 compares the connection information with the connection setting parameter in S105 and there is a problem, it is determined that a device is removed, and the operation proceeds to TRUE processing (S1072) to perform the connection setting data creation processing.

Figure 11:
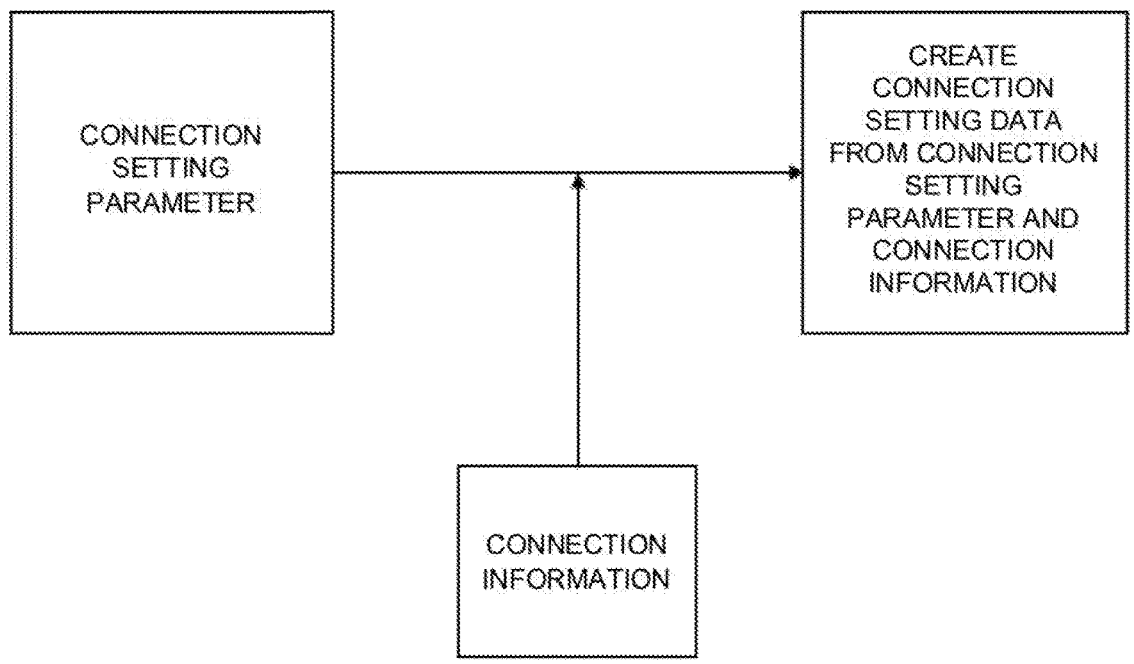
FIG. 11 is a diagram describing a concept of the connection setting data creation processing.

In the conventional numerical controller, the connection setting data is created from the connection setting parameter. On the other hand, as illustrated in FIG. 11, in the numerical controller 1 according to the present embodiment, the connection setting data is created by considering not only the connection setting parameter but also information obtained from the connection information.

S1072: The connection setting data creation unit 104 identifies the removed device (device A) by comparing connection information before removal of the device with connection information after removal of the device.

The connection information before removal of the device corresponds to the connection information stored in the connection information storage unit 102 in S106. FIG. 8 illustrates an example of the connection status before removal of the device, and the connection information corresponding thereto is illustrated in FIG. 13. The connection information after removal of the device corresponds to the connection information stored in the connection information acquisition unit 101 in S104. FIG. 9 illustrates an example of the connection status after removal of the device, and the connection information corresponding thereto is illustrated in FIG. 14.

A process of identifying the removed device will be described in detail with reference to FIG. 15. When the connection information before removal of the device (FIG. 13) and the connection information after removal of the device (FIG. 14) are compared in ascending order of the connection numbers, a mismatch occurs in connection number 3. Further, a device ID corresponding to connection number 4 subsequent to the mismatch number in the connection information before removal of the device (FIG. 13) matches a device ID corresponding to connection number 3 of the connection information after removal of the device (FIG. 14). From this point, the connection setting data creation unit 104 can identify that the device of connection number 3 (corresponding to device A) is removed from the connection information before removal of the device (FIG. 13). In addition, the connection setting data creation unit 104 identifies that connection number 4 of the connection information before removal of the device (FIG. 13) corresponds to connection number 3 of the connection information after removal of the device (FIG. 14).

For example, the connection setting data creation unit 104 may cause the display/MDI unit 70 to list and display the connection information before removal of the device (FIG. 13), make the user designate connection information related to the removed device, detect the designated connection information, and set a device ID included in the designated connection information as device A.

S1073: The connection setting data creation unit 104 excludes a record related to device A identified in S1072 from the connection setting parameter supplied from the connection setting parameter reading unit in S102. In addition, the connection setting data creation unit 104 rewrites a connection number of the connection setting parameter related to a device whose connection number is changed by removal of device A.

FIG. 16 is an example of the connection setting parameter before removal of the device supplied from the connection setting parameter reading unit in S102. When connection number of device A=3 is identified in S1072, the connection setting data creation unit 104 deletes a record of connection number=3 from a table illustrated in FIG. 16. In addition, since there is a device whose connection number is changed from 4 to 3 due to an influence of removal of device A, the connection setting data creation unit 104 rewrites a connection number of a record corresponding to connection number=4 to 3 in the table illustrated in FIG. 16. A table created in this way is illustrated in FIG. 17.

The connection setting data creation unit 104 creates connection setting data based on the table (FIG. 17) created by the above processing. A method of creating the connection setting data is the same as a conventional method of creating the connection setting data from the connection setting parameter.

S108: The connection processing execution unit 105 performs connection processing of the device using the connection setting data created by the connection setting data creation unit 104 in S107.

According to the present embodiment, it is unnecessary to perform an operation of resetting the connection setting parameter when the user removes the device connected to the numerical controller 1, and thus it is possible to reduce erroneous setting and burden of setting.

In addition, according to the present embodiment, when a removed device is installed at the same position as before, it is unnecessary to reset the connection setting parameter since connection processing is normally performed using the connection setting parameter before removal of the device, which is supplied from the connection setting parameter reading unit in S102 (the operation proceeds to TRUE processing in S105). Therefore, it is possible to reduce erroneous setting and burden of setting of the connection setting parameter even when the device is reconnected.

The application is not limited to the above embodiment, and may be implemented in various modes by making an appropriate change.

The invention claimed is:

1. A numerical controller in which a plurality of devices is allowed to be connected to a serial bus by a daisy chain, the numerical controller comprising:
    a processor configured to:
        acquire, from each of the devices, a connection number indicating a connection position of the device on the daisy chain and a device ID corresponding to identification information unique to the device as connection information;
        determine presence or absence of a problem by comparing the connection information including respective connection numbers of each of the devices with respective connection numbers of a connection setting parameter obtained by associating the connection number with a logic axis number corresponding to identification information of a logic axis of the numerical controller, the connection numbers of each of the devices identifying a respective connection order of the devices in the daisy chain;
        store the connection information acquired when the connection numbers of each of the devices matches with the connection numbers of the connection setting parameter; and
        identify a removed device when the connection number of the removed device does not match any of the connection numbers in the connection setting parameter, and create connection setting data by renumbering one the remaining devices to use the connection number of the removed device.

2. The numerical controller according to claim 1, wherein the processor is further configured to determine that there is a problem when the connection number included in the connection setting parameter does not match the connection number included in the connection information, and determine that there is no problem otherwise.

3. The numerical controller according to claim 1, wherein the processor is further configured to identify an unmatched device ID as the removed device by comparing the acquired connection information with the stored connection information.

4. The numerical controller according to claim 1, wherein the processor is further configured to create the connection setting data by deleting a record matching a connection number of the removed device from the connection setting parameter.

5. The numerical controller according to claim 1, wherein the processor is further configured to cause the acquired connection information to be listed and displayed, detect that one of the displayed connection information has been designated, and identify a device ID related to the designated connection information as the removed device.

\* \* \* \* \*